Figure 1:
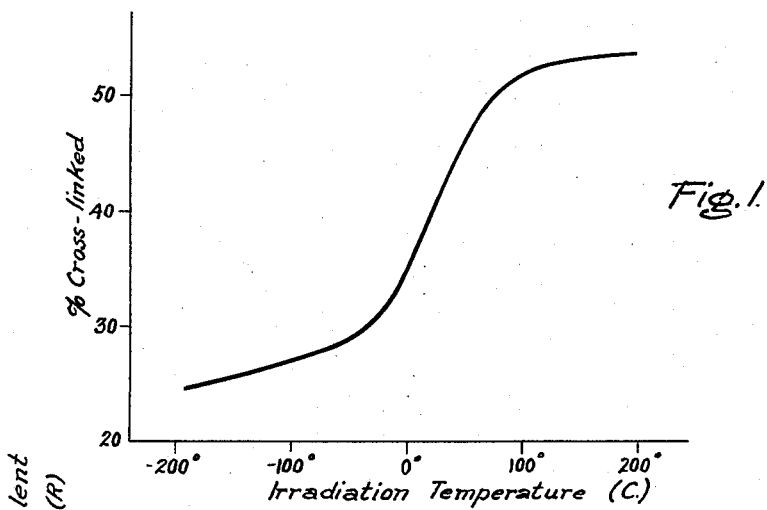

Inventors:
Elliott J. Lawton;
Arthur M. Bueche,
by Paul A. Frank
His Attorney.

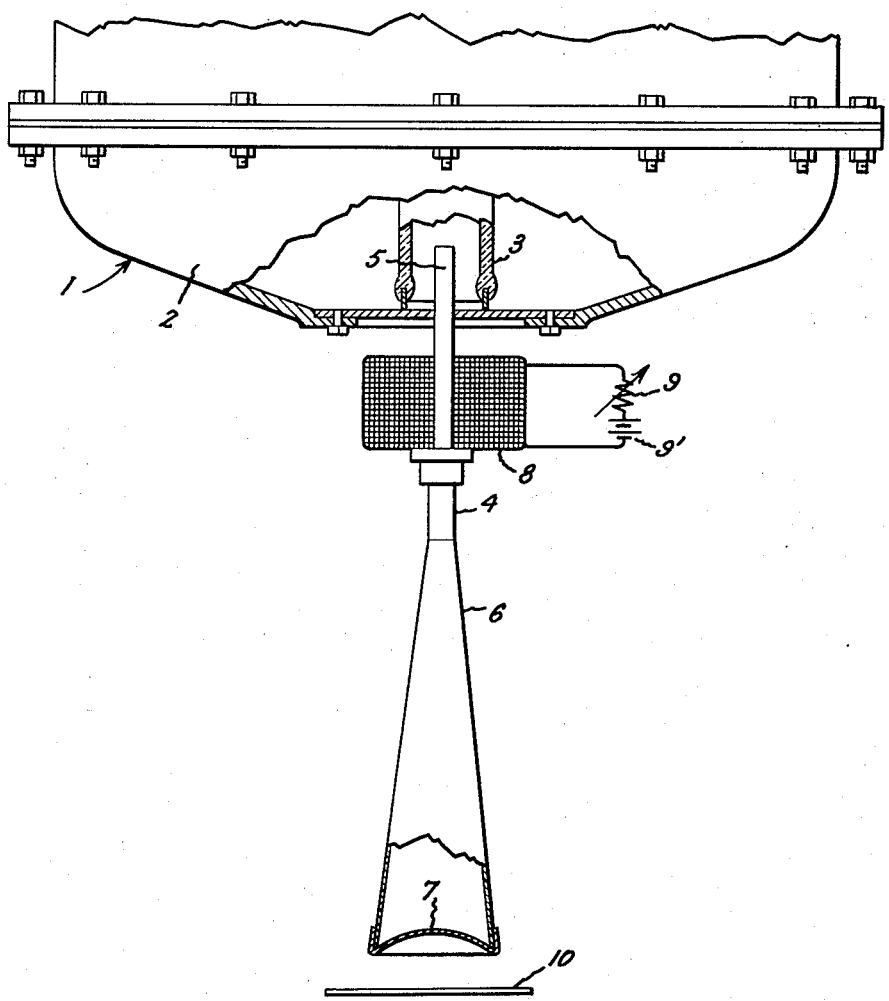

2,906,678

PROCESS OF IRRADIATING POLYETHYLENE AT ELEVATED TEMPERATURES

Elliott J. Lawton and Arthur M. Bueche, Schenectady, N.Y., assignors to General Electric Company, a corporation of New York Application April 11, 1955, Serial No. 500,509

5 Claims. (Cl. 204—154)

This application is a continuation-in-part of our application, Serial No. 324,552, filed December 6, 1952 (hereafter called the parent application), and assigned to the same assignee as the present application.

This present invention relates to the high energy irradiation of polyethylene at elevated temperatures (i.e., above room temperature). More particularly, this invention relates to a method of increasing the amount of cross-links in polyethylene without a corresponding increase in the number of irradiation-produced trans-unsaturated groups

(hereafter called unsaturate), by the high energy irradiation of polyethylene at elevated temperatures. This invention also relates to the novel products produced by this process.

The polyethylene referred to herein in a polymeric material formed by the polymerization of ethylene at high temperatures and pressures. Various polyethylenes are described in Patent 2,153,553 and in "Modern Plastics Encyclopedia," New York 1949, pages 268–271. One specific example of commercially available polyethylene is the polythene type D sold by E. I. du Pont de Nemours & Co., Inc., Wilmington, Delaware. Another specific example is du Pont polythene resin sold under the trade name "Alathon 7 and 8"; its properties, uses, etc., are set forth in the Du Pont Information Bulletin A–3584, published by the Du Pont Polychemicals Department. Other polyethylenes of various molecular weights are disclosed in Lawton et al., "Industrial & Engineering Chemistry," 46, pages 1703–1709 (1954).

In the copending parent application, there are disclosed and claimed high energy irradiated polyethylene compositions having at elevated temperatures markedly improved form stability, increased solvent resistance, and stress cracking properties. In accordance with the invention described and claimed in the aforesaid application, high energy irradiation obtained from high voltage accelerating apparatus is allowed to impinge upon preformed polyethylene shapes, such as tapes, sheets, various containers and bottles, etc., whereby as a result of such treatment, the irradiated polyethylene is better able to withstand high temperatures and effects of many solvents than is possible for the unirradiated polyethylene.

In the parent application, there is also disclosed the irradiation of polyethylene at various temperatures, from −74 to 193° C. Although uncross-linked polyethylene will totally dissolve in solvents, polyethylene which has been sufficiently cross-linked by irradiation does not dissolve to an appreciable extent but swells when in contact with these solvents. The degree of cross-linking present in these polyethylene samples which have been irradiated at a certain temperature is usually evaluated by the amount of linear swelling which occurs when these samples are placed in contact with certain solvents. Since resistance of polymeric materials to solvents is a measure of crosslinks, a convenient method of measuring cross-linking efficiency is by the comparison of the length of the irradiated polyethylene sample before immersion in a swelling solvent ($l_0$) to the length of the irradiated sample after immersion ($l$), i.e., $l/l_0$. The parameter $l_0$ is the length of an irradiated sample before immersion in the solvent, while $l$ is the length of the irradiated sample after immersion in the solvent for a period sufficiently long so that further changes are negligible. To eliminate any effect of degree of crystallinity, the measurements are made at 90° C. in toluene for at this temperature crystallinity is reduced to a minimum. If the samples are initially all the same size and swelling occurs isotropically (i.e., proportionally equal in all directions), $l/l_0$ should be a direct indication of the amount of swelling of the samples in the solvent. Toluene and other aromatic or substituted aromatic compounds, such as xylene, mesitylene, nitrobenzene, benzene (under pressure), etc., or mixtures of such compounds, are solvents for polyethylene and the use of the word "solvents" herein refers to such compounds or compound mixtures. Since irradiation greatly enhances the solvent resistance of polyethylene, irradiation reduces the amount of swelling of polyethylene in a "swelling agent."

In the swelling measurements of the parent application, only the lengths of the irradiated material were compared as a measure of cross-linking since it was assumed that polyethylene swelled isotropically. Further work on the inherent properties of the polyethylene produced by irradiation at elevated temperatures in the manner of the method described in the parent application showed that solvent swelling was not isotropic because when the original polyethylene sheets were formed from powder pressed into sheet form at 120–150° C., no attempt was made to relieve the stresses present therein. Thus, a true measure of the amount of inherent cross-links resulting from irradiation at elevated temperatures was not arrived at in the parent application based on linear swelling measurements alone since the anisotropic three-dimensional swelling effect (i.e., non-proportionally equal in all directions) was not taken into consideration. Although the percentage error in the amount of swelling is minor when applied to a wide range of irradiation doses, it is particularly significant where the swelling differential is comparatively small as in the case with swelling measurements at various temperatures using a constant dose. These three-dimensional swelling measurements as indicative of the degree of cross-linking checked quite closely with cross-links determined by solubility measurements. Therefore, $V/V_0$ is a more accurate measure of the degree of cross-linking where $V_0$ is the volume of polyethylene after irradiation and $V$ is the volume of the same after being treated with a swelling agent.

Solubility measurements as a measure of percentage of cross-linking are based on the phenomenon that when polyethylene is subjected to irradiation, a principal effect is the formation of cross-links. At some minimum dose, the number of cross-links is sufficient to form gel particles insoluble in such solvents for polyethylene as hot toluene while at higher doses the polymer is sufficiently gelled to resist disintegration in a hot solvent but still yields on swelling some solvent extractable materials.

The effect of irradiation on solubility measurements is determined as follows: A weighed piece of irradiated polyethylene, which could have, for example, the following measurements: .002" thickness x 1.25" diameter, is immersed in a solvent for polyethylene, such as about one liter of toluene, and heated under reflux for 2½ hours or more to insure complete extraction. The test piece is then removed from the solvent and dried to constant weight under reduced pressure. Percent weight loss is equal to $$\frac{(\text{Initial weight}) - (\text{final weight})}{\text{Initial weight}} \times 100$$

which value is inversely proportional to percent cross-linking. The changes due to irradiation at different temperatures as determined from solubility measurements are in close accord with the results obtained from anisotropic swelling measurements.

By the above methods of determining cross-links, it is discovered that one of the inherent effects of the process of irradiating polyethylene at elevated temperatures as carried out in our parent application is that the cross-linking effectiveness of an irradiation dose is enhanced, thus effecting a less costly method of producing polyethylene possessing at elevated temperatures improved form stability, increased solvent resistance, and stress cracking properties. Furthermore, elevated temperature irradiation increases the cross-linking effectiveness of an irradiation dose without increasing the number of irradiation-produced unsaturates in the polyethylene, thus producing a polymer that is less susceptible to agents that affect these reactive unsaturated groups.

High energy irradiation of polyethylene causes the liberation of a mixture of gases of which hydrogen is the chief constituent. The presence of hydrogen gas indicates that hydrogen atoms removed by ionizing irradiation combine to form hydrogen molecules. If the points of hydrogen removal are on different molecules of polyethylene, cross-linking occurs, but, if hydrogens are removed from adjacent carbons on the same polyethylene molecule, trans-unsaturation

results. The amount of this trans-unsaturation in the polymer produced by irradiation is determined by changes in the absorption in the infrared absorption peak 10.35µ. In Lawton et al., "Journal of American Chemical Society" 76, pages 3437–3439 (1954), it is shown that at room temperature, this type of irradiation-produced trans-unsaturation increases with increasing irradiation.

Polyethylene irradiated at elevated temperatures to a radiation dose of $3 \times 10^6$ to $5 \times 10^8$ Rep. in the manner described in the parent application possesses an unexpected low ratio of unsaturates to the number of cross-links. Despite the fact that a greater number of cross-links results from the high temperature irradiation than would result from the same irradiation dose at room temperature, there is unexpectedly no increase in the number of unsaturates although the effective dose for the same cross-linking dose at room temperature would also produce more of these unsaturates. In practice, we prefer to irradiate from about 85° C. to just below the melting point of the individual polyethylene used, for example, about 100° C. for a commercial polyethylene having a molecular weight of about 20,000 since in this manner we obtain maximum cross-linking without losing the shape of the irradiated material.

This invention may be understood by reference to the following example and the accompanying drawing which are presented by way of illustration not by way of limitation.

*Example 1*

A 2-mil polyethylene film having a molecular weight of 21,000 was cross-linked by the irradiation produced by an 800 kilovolt (peak), hereafter referred to as kvp., transformer to an irradiation dose in each case of $7.8 \times 10^6$ Roentgens (R.) at various temperatures, over the temperature range shown in Fig. 1. A Roentgen unit as usually defined is the amount of radiation that produces one electrostatic unit of charge per milliliter of dry air under standard conditions and, as employed here, refers to the amount of electron radiation measured with an air equivalent ionization chamber at the position of the upper surface of the polymeric material.

These results are presented in Fig. 1 where the abscissa represents the degree centigrade temperature of the polyethylene during irradiation and the ordinate represents the percent of the polyethylene cross-linked by the irradiation dose of $7.8 \times 10^6$ in each case.

The percent of cross-linked material in Fig. 1 was determined by solubility measurements. The changes found by these measurements checked quite closely with anisotropic swelling measurements; i.e., as the percent of cross-linked material increased, the swelling ratio decreased. This figure demonstrates the cross-linking effectiveness of a constant irradiation dose when polyethylene is irradiated over a wide temperature range. Elevated temperature enhances cross-linking effectiveness.

Figure 2:
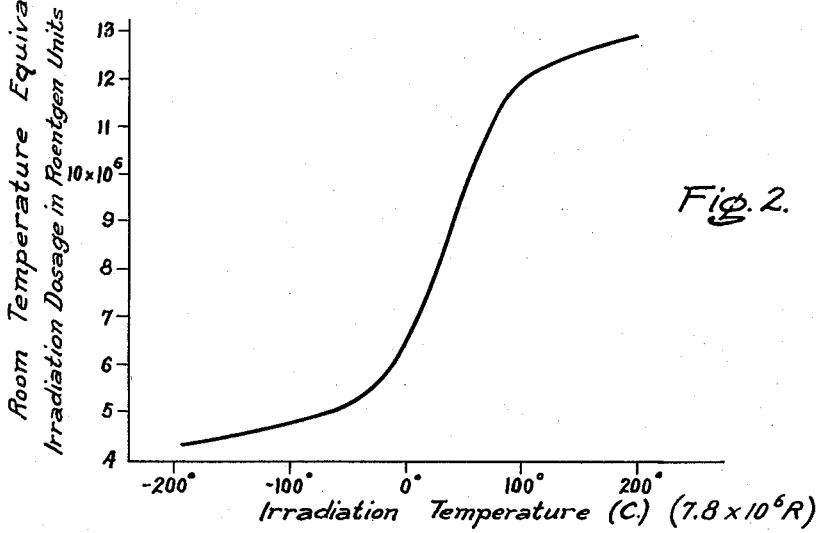

Fig. 2 represents the room temperature irradiation dose necessary to produce the same degree of cross-linking in polyethylene which would be equivalent to a dose of $7.8 \times 10^6$ R. at various temperatures. The abscissa represents the temperature in degrees centigrade at which polyethylene is irradiated with $7.8 \times 10^6$ R. and the ordinate represents the room temperature irradiation dosage in Roentgen units which is equivalent in cross-linking effect to $7.8 \times 10^6$ R. at any particular temperature selected on the abscissa. For example, $7.8 \times 10^6$ R. at 60° C. (read on the abscissa) would be equivalent to $10.2 \times 10^6$ R. at room temperature (read on the ordinate), and $7.8 \times 10^6$ R. at 80° C. would be equivalent to $11.5 \times 10^6$ R. at room temperature.

The significance of the enhancing effect of temperature on cross-linking is that costly irradiation can be used more effectively as a polyethylene cross-linking agent at elevated temperatures.

Figure 3:
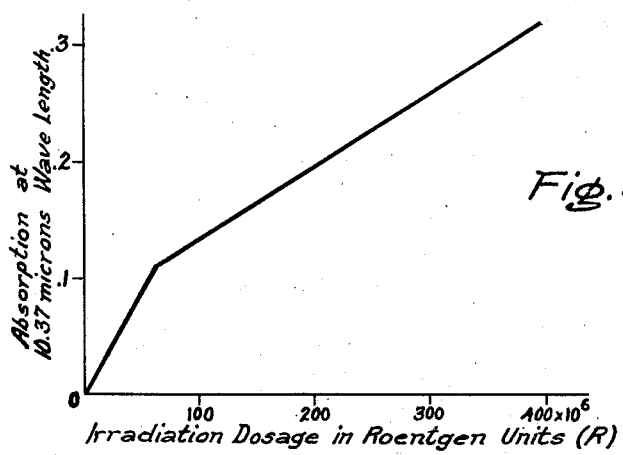

Fig. 3 represents irradiation-produced transunsaturation expressed as the amount of absorption at 10.37 microns wavelength produced by irradiating polyethylene between 25° and 150° C. at various irradiation doses. The abscissa represents the irradiation dose in Roentgen units and the ordinate represents irradiation-produced absorption expressed in terms of optical density. Since irradiation-produced unsaturates in polyethylene depend on total irradiation dose and are independent of temperature, the unsaturate lines from 25° to 150° C. are substantially identical and, therefore, appear as one line on the graph.

Thus, by elevated temperature irradiation, it is possible increase cross-linking without appreciably increasing the number of irradiation-produced unsaturates. The significance of this is that it is not only possible to less expensively produce a cross-linked polyethylene at elevated temperatures but also to have this polymer possess the property of being more stable because it possesses a lower ratio of unsaturates to cross-links than a room temperature-irradiated polyethylene that has been irradiated to the same percent of cross-links.

The high voltage accelerating apparatus shown in Fig. 4 can be used in the instant process. Referring particularly now to Fig. 4, there is shown high voltage accelerating apparatus 1 capable of producing a beam of high energy electrons for irradiating polymeric materials in accordance with the invention. High voltage accelerating apparatus 1 may be of the type disclosed in United States Patent No. 2,144,518 patented by Willem F. Westendorp on January 17, 1939, and assigned to the assignee of the present invention. In general, this apparatus comprises a resonant system having an open-magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 16, pp. 128-133 (1944).

To permit utilization of the high energy electrons accelerated down envelope 3, there is provided an elongated metal tube tube 4, the upper portion 5 of which is hermetically sealed to tank 2, as illustrated, by any convenient means such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies of about 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focusing of the accelerated electrons may be secured by a magnetic-field generating winding 8 energized by a source of direct current 9' through a variable resistor 9.

In producing the form stable and solvent resistant materials according to the invention, a sheet 10 of polyethylene can be supported in the path of the electrons emerging from end-window 7 as illustrated. The high energy electrons penetrate the polymeric material to a depth depending upon their energy and effect the above modifications in the properties of the material. Of course, sheet 10 can be in the form of strip material which is passed continuously under an end-window 7 at a velocity selected to give the desired irradiation dosage. Other expedients for obtaining the irradiation of the polymeric materials in various shapes (e.g., bottles, cups, tubing, thread, etc.) will be apparent to those skilled in the art. If the polymeric materials are initially in the liquid form, suitable receptacles for containing them can be utilized. The uniform treatment of polymeric materials having appreciable thickness can be assured by irradiating them first from one side and then from the other, or in some cases from both sides simultaneously. In certain instances, it may be desirable to irradiate the polymeric materials in an atmosphere of nitrogen, argon, helium, krypton or xenon, etc., to prevent the effect of any corona which may be present.

In performing the irradiations at temperatures of 128 to 193° C., the polyethylene samples were in liquid form when the irradiation was initiated; however, during the irradiation, the samples solidified. At temperatures below the flow point, the samples were in solid form throughout the irradiation.

It will be readily realized that other forms of electron accelerating apparatus may be employed instead of high voltage apparatus 1. For example, linear accelerators of the type described by J. C. Slater in the "Reviews of Modern Physics," vol. 20, No. 3, pp. 473-518 (July 1948), may be utilized. In general, the energy of the electrons employed in the practice of the invention may range from about 50,000 electron volts to 20 million electron volts or higher, depending upon the depth to which it is desired to affect the polymeric materials. To decrease wasteful energy absorption between the point of exit of electrons from the accelerating apparatus and the polymeric materials, a vacuum chamber having thin entrance and exit windows may be inserted in the space.

The effect of initial molecular weight on irradiated polyethylene is similar to that described in the parent application except that at elevated temperatures, lower irradiation doses can be used to obtain an equal degree of cross-linking. For example, we have found that polyethylene irradiated at 90° C. to a dose of $7 \times 10^6$ R. had the same high temperature tensile strength (145° C.) and hot solvent swelling properties as the same material irradiated at $11 \times 10^6$ R. at 25° C. Furthermore, these irradiated products possess the advantage of a low ratio of unsaturates to cross-links. These properties make the new materials particularly adaptable as a stable insulating tape, and for many other applications which will appear to those skilled in the art. Thus, with specified polymeric materials irradiated according to this invention, advantage can be taken of their outstanding electrical properties in applications where they have been heretofore unsuccessful because of their inability to withstand elevated temperatures. Also the specified irradiated materials may be employed in applications, such as fluid conduits or containers, where the unirradiated polymer could not be used because of the presence of solvents or high temperatures. These products are more suitable than room temperature-irradiated polyethylenes, particularly when used as conduits or containers for reagents that attack unsaturated bonds. Moreover, by properly adjusting the intensity of the irradiation in relation to the thickness of the material being irradiated, a "case hardening" effect can be obtained; i.e., the exterior portion of an article can be irradiated while the interior remains essentially unirradiated, thereby making possible new molding techniques by melting and removing the interior, new variable property articles, etc.

What we claim as new and desire to secure by Letters Patent of the United States is:

1. A process of irradiating polyethylene with electrons having an energy of $5 \times 10^4$ to $2 \times 10^7$ electron volts to an irradiation dose of $3 \times 10^6$ to $5 \times 10^8$ REP which comprises performing the irradiation while the polyethylene is heated to a temperature in the range of 85° C. to just below the melting point of the polymer, thereby producing a material with a higher ratio of cross-links to trans-unsaturate groups than would have been obtained if the polyethylene had been irradiated at room temperature to a radiation dose producing the same number of cross-links.

2. The product produced in claim 1 having improved resistance to oxidation because of the higher ratio of cross-links to trans-unsaturate groups as compared to what it would have had if it had been irradiated at room temperature to the same degree of cross-linking.

3. A process for producing an article of manufacture comprising polyethylene which comprises the high energy irradiation of the polyethylene contained therein with electrons having an energy of $5 \times 10^4$ to $2 \times 10^7$ electron volts to an irradiation dose of $3 \times 10^6$ to $5 \times 10^8$ REP while the article of manufacture is heated to a temperature in the range of 85° C. to just below the melting point of the polymer contained therein, thereby producing an article having improved oxidation resistance due to the higher ratio of cross-links to trans-unsaturate groups than it would have had if the article had been irradiated at room temperature to the irradiation dose producing the same number of cross-links.

4. The article of manufacture produced in claim 3 having an improved resistance to oxidation due to a higher ratio of cross-links to unsaturate groups as compared to what it would have had if it had been irradiated at room temperature.

5. A process of producing irradiated polyethylene having a maximum ratio of cross-links to unsaturated groups which process comprises treating polyethylene with electrons having an energy in the range of $5 \times 10^4$ to $2 \times 10^7$ electron volts to a radiation dose in the range of $3 \times 10^6$ to $5 \times 10^8$ REP at a temperature of from 85° C. to just below the melting point of said polyethylene.

(References on following page)

References Cited in the file of this patent

UNITED STATES PATENTS 1,906,402    Newton ---------------- May 2, 1933

FOREIGN PATENTS 144,291    Switzerland ------------ May 30, 1927

OTHER REFERENCES

Chapiro: Chemical Abstracts, vol. 44, columns 6192, 6193 (1950).

Glasstone: Sourcebook of Atomic Energy, page 514 (1950), D. Van Nostrand Co., N.Y.C.

"Science," vol. 113, pages 718, 719, January-June 1951.

Sissman et al.: U.S.A.E.C., O.R.N.L. 928, June 29, 1951 (available from AEC, Oak Ridge, Tenn.), pages 9–13, 16, 24, 79–82, 191.

Rollefson et al.: "Annual Review of Physical Chemistry", vol. 3, page 64. Received in Patent Office Library Oct. 20, 1952.